US012608129B2

(12) United States Patent
Larson et al.

(10) Patent No.: US 12,608,129 B2
(45) Date of Patent: Apr. 21, 2026

(54) FAST INITIALIZATION OF MEDIA AFTER LOGICAL BLOCK ADDRESS (LBA) REMAPPING OPERATION

(71) Applicant: Western Digital Technologies, Inc., San Jose, CA (US)

(72) Inventors: Andrew Larson, Rochester, MN (US); Shad Thorstenson, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 31 days.

(21) Appl. No.: 18/535,489

(22) Filed: Dec. 11, 2023

(65) Prior Publication Data

US 2025/0190107 A1     Jun. 12, 2025

(51) Int. Cl.
G06F 3/06           (2006.01)

(52) U.S. Cl.
CPC .......... G06F 3/0604 (2013.01); G06F 3/0632 (2013.01); G06F 3/0659 (2013.01); G06F 3/0676 (2013.01)

(58) Field of Classification Search
CPC .... G06F 3/0604; G06F 3/0632; G06F 3/0659; G06F 3/0676
See application file for complete search history.

(56) References Cited

U.S. PATENT DOCUMENTS

| | | | |
|---|---|---|---|
| 6,925,530 B2 | 8/2005 | Busser et al. | |
| 7,752,491 B1 * | 7/2010 | Liikanen | G11B 20/1883 |
| | | | 714/6.13 |
| 9,430,383 B2 | 8/2016 | Tao et al. | |
| 10,380,036 B2 | 8/2019 | Fleur | |
| 11,074,937 B1 * | 7/2021 | Kawai | G11B 20/1258 |
| 2006/0136662 A1 * | 6/2006 | Forrer, Jr. | G06F 13/385 |
| | | | 711/112 |
| 2011/0238888 A1 * | 9/2011 | Chiu | G06F 12/0246 |
| | | | 711/170 |
| 2013/0346733 A1 | 12/2013 | Groot et al. | |

(Continued)

FOREIGN PATENT DOCUMENTS

| | | | |
|---|---|---|---|
| JP | 7234176 B2 | 3/2023 | |

OTHER PUBLICATIONS

Dufrasne et al., IBM DS8880 Architecture and Implementation (Release 8.5), Oct. 14, 2018, p. 512.

(Continued)

*Primary Examiner* — Tracy A Warren
(74) *Attorney, Agent, or Firm* — NOD Law PC

(57)                    ABSTRACT

A data storage device comprises recording heads and magnetic recording media. An initialization process is performed following a logical block address (LBA) remapping operation that remaps LBAs to physical locations on the media. The initialization process comprises initializing a write target LBA in response to a write command by writing data to a physical location on the media that is mapped to the write target LBA, receiving a read command to read data from a read target LBA, reading and returning data from the physical location on the magnetic recording media that is mapped to the read target LBA if the read target LBA has been initialized, and generating and returning a background data pattern if the read target LBA has not been initialized.

21 Claims, 4 Drawing Sheets

(56)  References Cited

U.S. PATENT DOCUMENTS

2014/0317347 A1* 10/2014 Aida ...................... G11B 5/012
                                                       711/114
2016/0293207 A1   10/2016 Fukuhisa
2019/0056882 A1*  2/2019 Feldman ............... G06F 3/0608
2019/0073158 A1*  3/2019 Kondo .................. G06F 3/0604

OTHER PUBLICATIONS

Western Digital SDC, Repurposing Depopulation: Extending storage device service lifetimes, 2017, p. 21.

* cited by examiner

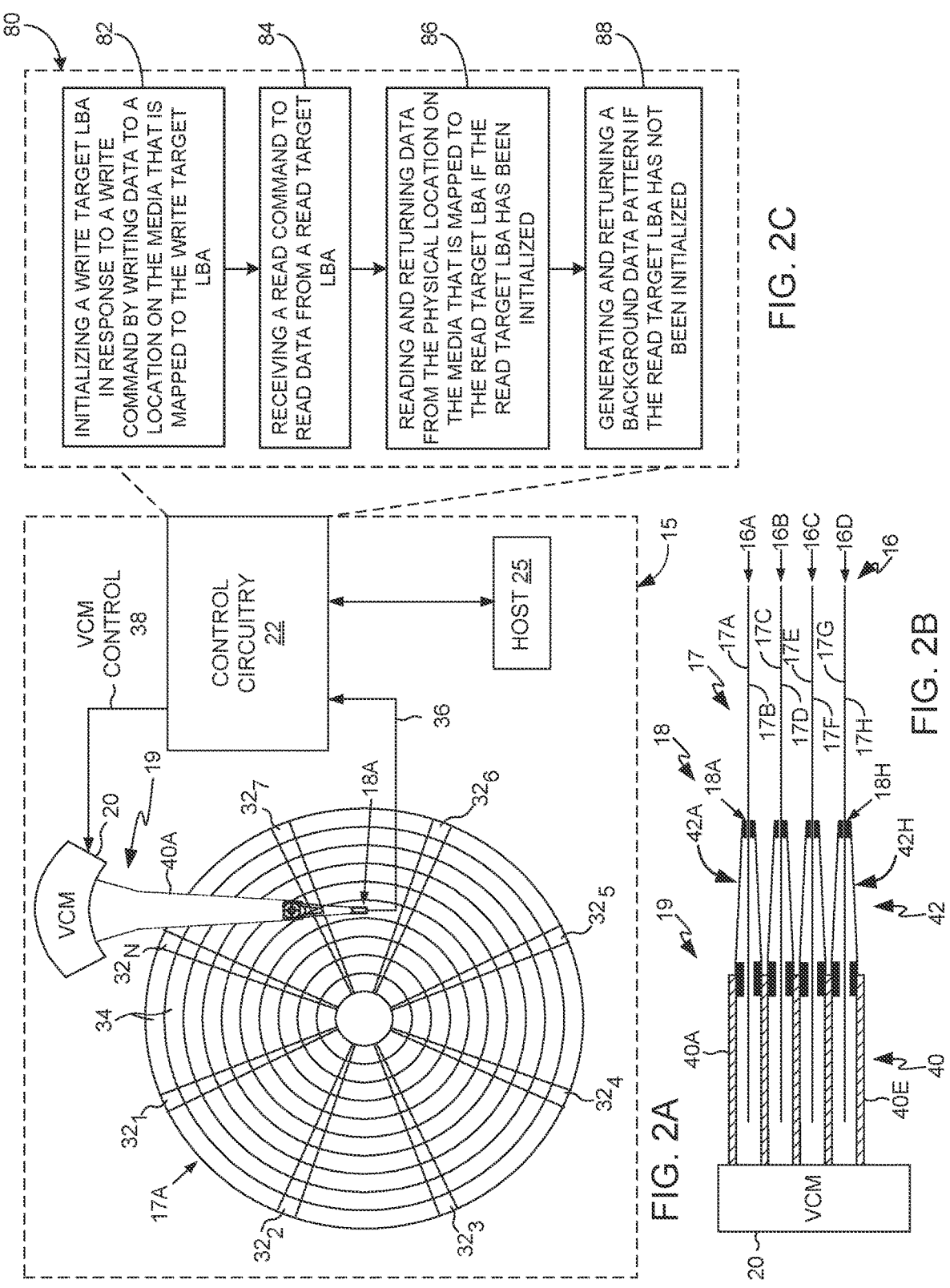

INITIALIZING A WRITE TARGET LBA IN RESPONSE TO A WRITE COMMAND BY WRITING DATA TO A LOCATION ON THE MEDIA THAT IS MAPPED TO THE WRITE TARGET LBA

RECEIVING A READ COMMAND TO READ DATA FROM A READ TARGET LBA

READING AND RETURNING DATA FROM THE PHYSICAL LOCATION ON THE MEDIA THAT IS MAPPED TO THE READ TARGET LBA IF THE READ TARGET LBA HAS BEEN INITIALIZED

GENERATING AND RETURNING A BACKGROUND DATA PATTERN IF THE READ TARGET LBA HAS NOT BEEN INITIALIZED

FIG. 2C

FAST INITIALIZATION OF MEDIA AFTER LOGICAL BLOCK ADDRESS (LBA) REMAPPING OPERATION

BACKGROUND

Data storage devices such as hard disk drives (HDDs) comprise magnetic recording media in the form of one or more disks, and one or more recording heads connected to distal ends of actuator arms that are rotated by actuators to position the heads radially at carefully controlled fly heights over the disk surfaces. The disk surfaces comprise a plurality of radially spaced, concentric tracks for recording user data sectors and servo wedges or sectors. The servo tracks are written on previously blank disk drive surfaces as part of the final stage of preparation of the disk drive. The servo sectors comprise head positioning information (e.g., a track address) that is read by the heads and processed by a servo control system to control the actuator arms as they seek from track to track.

FIG. 1 is a conceptual diagram of a conventional disk format 2 comprising a number of radially-spaced, concentric servo tracks 4 defined by servo wedges $6_0 \ldots 6_N$ recorded around the circumference of each servo track 4. A plurality of concentric data tracks are defined relative to servo tracks 4 and may have the same or a different radial density (e.g., tracks per inch) than servo tracks 4. Each servo wedge (e.g., servo wedge $6_4$) comprises a preamble 8 for storing a periodic pattern that allows for proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo wedge further comprises groups of phase-based servo bursts 14 (e.g., N and Q servo bursts) that are recorded with a predetermined phase relative to one another and relative to the servo track centerlines.

The coarse head positioning information is processed to position a head over a target data track during a seek operation, and servo bursts 14 provide fine head positioning information used for centerline tracking while accessing a data track during read and write operations. A position error signal (PES) generated by reading servo bursts 14 represents a measured position of the head relative to a centerline of a target servo track. A servo controller processes the PES to generate a control signal applied to an actuator to actuate the head radially over the disk in a direction that reduces the PES.

The description provided in this background section should not be assumed to be prior art merely because it is mentioned in or associated with this background section. The background section may include information that describes one or more aspects of the subject technology.

SUMMARY

The following summary relates to one or more aspects or embodiments disclosed herein. It is not an extensive overview relating to all contemplated aspects or embodiments, and should not be regarded as identifying key or critical elements of all contemplated aspects or embodiments, or as delineating the scope associated with any particular aspect or embodiment. The following summary has the sole purpose of presenting certain concepts relating to one or more aspects or embodiments disclosed herein in a simplified form to precede the detailed description that follows.

The location of a block of data stored on an HDD is specified by a logical block address (LBA), which is a simple linear addressing scheme in which blocks are located by an integer index, with the first block being LBA 0, the second block being LBA 1, and so on. LBAs, in turn, are mapped to physical locations on the magnetic storage media (disk). It sometimes becomes necessary to perform an LBA remapping operation in which the LBAs are remapped to different physical locations on the media. For instance, an LBA remapping operation may be necessary after an HDD formatting operation that involves a block size change, or following a repurposing depopulation (RDP) operation that removes a defective or failed recording head of the HDD from service, with the other heads remaining in service.

Following an LBA remapping operation, a conventional initialization procedure is typically performed in which a predetermined background data pattern is written to each of the remapped LBAs. This procedure is sometimes referred to as a "pack write". The background data pattern, if subsequently read, is what the host and the HDD expect to be returned in response to a read command following an initialization, and indicates to the host and the HDD that the LBA has been properly initialized. Writing the background data pattern to the remapped LBAs thereby avoids errors when a host attempts to read from an initialized LBA before it has been written to (host reads before writes), as well as when an initialized LBA is read as part of internal HDD operations (such as track refreshes, background media scans, etc.).

A significant drawback of this conventional initialization procedure that follows an LBA remapping operation is the very substantial length of time that it takes to complete. Data transfer rates have not kept pace with ever-increasing HDD storage capacities, which now reach sizes of 20-30 TB or more. As a result, the conventional process of pack writing an HDD after an LBA remapping operation (i.e., writing the background data pattern to every remapped LBA) can be very time-consuming, often taking a day or longer.

In accordance with aspects of this disclosure, an initialization method is provided that advantageously eliminates the need to pack write a background data pattern to the entire HDD after an LBA remapping operation. The process of rebuilding the drive can begin immediately after an LBA remapping operation without incurring a substantial delay while the background data pattern is written to the HDD. Aggregated groups or "mapping units" of LBAs are initialized "on the fly" when any LBA within the mapping unit is written to, whether the writes occur in a sequential or random fashion. During the initialization process, if an attempt is made to read to an LBA that has not yet been initialized, rather than directing the read to a physical location on the media, the expected background data pattern is internally generated by the HDD and returned in response to the read. Importantly, this is transparent to the host as compared to the traditional process in which, following a lengthy pack write during a conventional initialization procedure, a read command to an LBA that has not yet been written to accesses the physical location on the media to retrieve the background data pattern that was written during the pack write.

Some aspects of this disclosure are directed to a data storage device comprising a plurality of recording heads and a plurality of magnetic recording media. Control circuitry is configured to perform an LBA remapping operation that remaps LBAs to physical locations on the magnetic recording media. Following the LBA remapping operation, the control circuitry is configured to perform an initialization process comprising initializing a write target LBA in response to a write command by writing data to a physical location on the magnetic recording media that is mapped to the write target LBA; receiving a read command to read data from a read target LBA; reading and returning data from the physical location on the magnetic recording media that is mapped to the read target LBA if the read target LBA has been initialized; and generating and returning a background data pattern if the read target LBA has not been initialized.

In some implementations, the initialization process performed by the control circuitry further comprises, before initializing any of the LBAs, forming a plurality of mapping units, wherein each of the mapping units covers a plurality of the LBAs; and mapping the mapping units to the background data pattern.

In some implementations, the initialization process performed by the control circuitry further comprises associating each of the mapping units with a validity bit that indicates whether the LBAs covered by an associated mapping unit have been initialized.

In some implementations, a combined size of the LBAs covered by a mapping unit is in a range of 1-4 MiB.

In some implementations, the initialization process performed by the control circuitry further comprises, when initializing the write target LBA, initializing all of the LBAs of a write target mapping unit covering the write target LBA by writing to physical locations on the magnetic recording media that are mapped to the LBAs of the write target mapping unit; and updating the validity bit associated with the write target mapping unit to indicate that the LBAs covered by the write target mapping unit have been initialized.

In some implementations, the initialization process performed by the control circuitry further comprises, when initializing all of the LBAs of the write target mapping unit, padding write data of the write target LBA with the background data pattern; and writing the write data and the background data pattern to physical locations on the magnetic recording media that are mapped to the LBAs of the write target mapping unit.

In some implementations, the initialization process performed by the control circuitry further comprises, after initializing all of the LBAs of the write target mapping unit, changing the mapping of the write target mapping unit from the background data pattern to the physical locations on the magnetic recording media that are mapped to the LBAs of the write target mapping unit.

Other aspects of this disclosure are directed to a method for initializing magnetic recording media of a data storage device following an LBA remapping operation that remaps LBAs to physical locations on the magnetic recording media. The method comprises initializing a write target LBA in response to a write command by writing data to a physical location on the magnetic recording media that is mapped to the write target LBA; receiving a read command to read data from a read target LBA; reading and returning data from the physical location on the magnetic recording media that is mapped to the read target LBA if the read target LBA has been initialized; and generating and returning a background data pattern if the read target LBA has not been initialized.

Further aspects of this disclosure are directed to a data storage device comprising a plurality of recording heads and a plurality of magnetic recording media. Control circuitry is configured to perform an initialization process comprising initializing a write target LBA in response to a write command by writing data to a physical location on the magnetic recording media that is mapped to the write target LBA;

receiving a read command to read data from a read target LBA; reading and returning data from the physical location on the magnetic recording media that is mapped to the read target LBA if the read target LBA has been initialized; and generating and returning a background data pattern if the read target LBA has not been initialized.

Various additional aspects of this disclosure are described below and depicted in the accompanying figures and will be further apparent based thereon.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different views. The drawings depict only illustrative examples of this disclosure and are not limiting in scope.

FIG. 2A is a conceptual diagram of a top view of a data storage device in the form of a hard disk drive (HDD), in accordance with aspects of this disclosure.

FIG. 2B is a conceptual diagram of a side view of a data storage device in the form of an HDD, in accordance with aspects of this disclosure.

FIG. 2C is a flow diagram of a method that a data storage device may perform, execute, and implement, in accordance with aspects of this disclosure.

DETAILED DESCRIPTION

Figure 1:
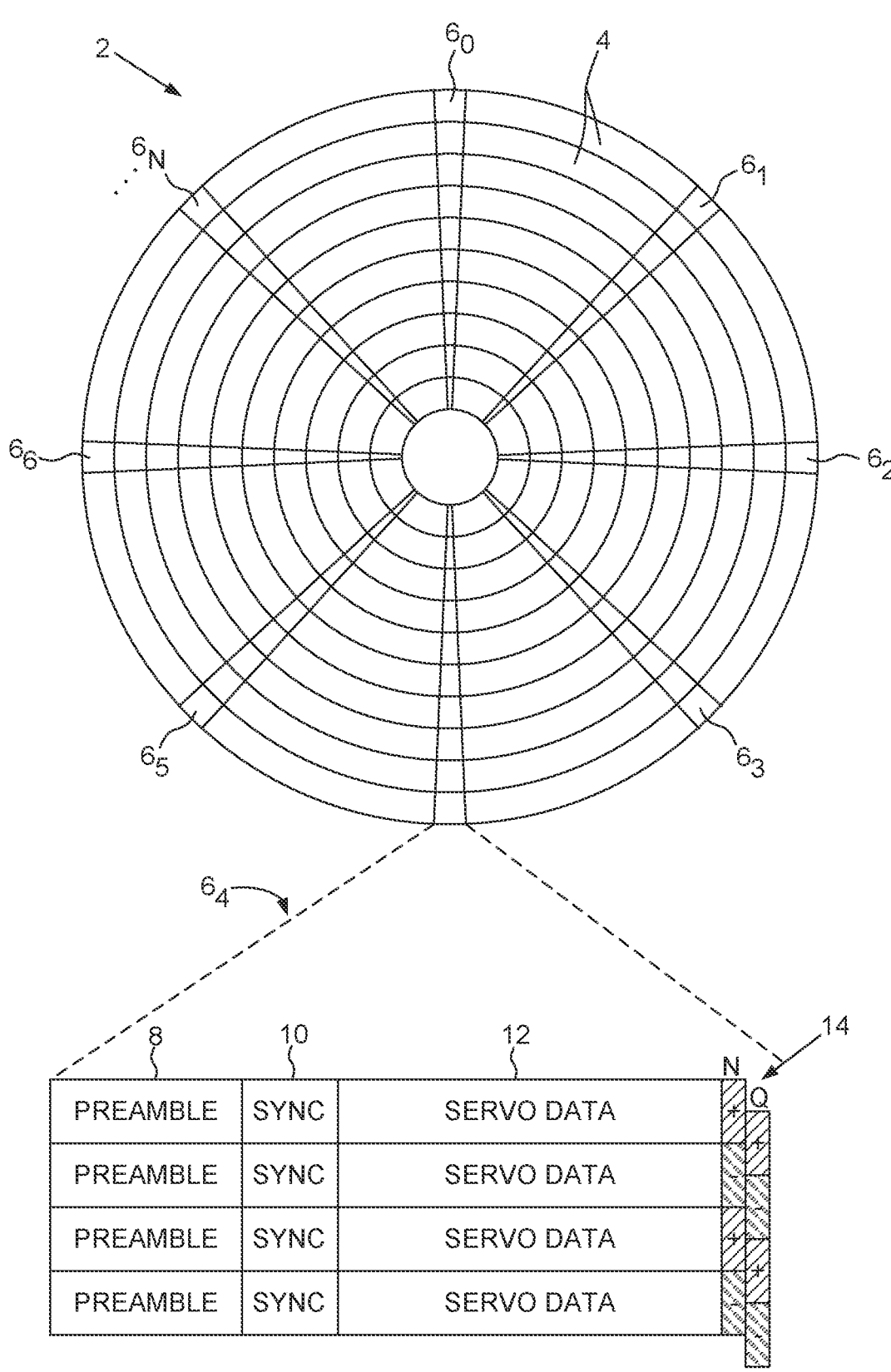
FIG. 1 is a conceptual diagram of a conventional disk format, in accordance with aspects of this disclosure.

The words "exemplary" and "example" as used herein mean "serving as an example, instance, or illustration." Any embodiment described herein as "exemplary" or as an "example" should not be construed as preferred or advantageous over other embodiments.

The embodiments described herein do not limit the invention to the precise form disclosed, nor are they exhaustive. Rather, various embodiments are presented to provide a description for utilization by others skilled in the art. Technology continues to develop, and elements of the disclosed embodiments may be replaced by improved and enhanced items. This disclosure inherently discloses elements incorporating technology available at the time of this disclosure.

FIGS. 2A and 2B are conceptual top and side views of a data storage device in the form of hard disk drive (HDD) 15, in accordance with aspects of this disclosure. HDD 15 comprises control circuitry 22, actuator assembly 19, and a plurality of hard disks 16 (e.g., disks 16A ... 16D). FIG. 2C is a flow diagram of a method 80 that control circuitry 22 of HDD 15 performs or executes in controlling the operations of HDD 15, in accordance with aspects of this disclosure. In particular, as will be described in more detail below, method 80 is an initialization process that may be performed following a logical block address (LBA) remapping operation that removes a recording head from service.

Actuator assembly 19 is configured to position heads 18 over surfaces 17 (e.g., surfaces 17A . . . 17H) of disks 16. Heads 18 comprise write and read elements configured for writing and reading control features and data to and from disk surfaces 17. Actuator assembly 19 comprises primary actuator 20, which is typically a voice coil motor (VCM), and a number of actuator arms 40 (e.g., actuator arms 40A . . . 40E). Each head 18 is configured at a distal end of an actuator arm 40 via a suspension 42 (e.g., suspensions 42A . . . 42H). Each actuator arm 40 is configured to suspend a head 18 in close proximity over a corresponding disk surface 17. For example, head 18A is suspended by topmost actuator arm 40A via suspension 42a over topmost disk surface 17A, and head 18H is suspended by lowest actuator arm 40H via suspension 42H over lowest disk surface 17H). FIGS. 2A-2B are presented for exemplary purposes only; a wide variety of other numbers of disks, disk surfaces, primary actuators, actuator assemblies, suspensions, and heads are contemplated and may be used.

FIG. 2A also depicts servo sectors 32 (e.g., servo sectors 32_1 . . . 32_N) written onto disk surfaces 17 (e.g., disk surface 17A) to define a plurality of evenly-spaced, concentric tracks 34. Each servo sector 32 may include a phase lock loop (PLL) field, a servo sync mark (SSM) field, a track identification (TKID) field, a sector ID, and a group of servo bursts (an alternating pattern of magnetic transitions) that the servo system of HDD 15 samples to align a head 18 with and relative to a particular track 34. Servo sectors 32 are spaced sequentially around the circumferences of tracks 34 and extend radially outward from the inner diameter of disk surfaces 17. Data is conventionally written in data regions in a plurality of discrete data sectors. Each data region is typically preceded by a servo sector 32.

Control circuitry 22 processes read signals 36 emanating from heads 18 (e.g., head 18A) to demodulate servo data written on the disk (e.g., servo sectors 32) to generate a position error signal (PES) representing an error between the actual position of the head and a target position relative to a target track. Control circuitry 22 processes the PES using a suitable servo control system to generate VCM control signal 38 that is applied to VCM 20, which rotates actuator arm 40 about a pivot to actuate head 18 radially over disk surface 17 in a direction that reduces the PES. In some examples, HDD 15 may also comprise a suitable micro actuator, such as a piezoelectric element, for actuating head 18 relative to a suspension 42, or for actuating a suspension 42 relative to actuator arm 40. Host 25 may be a computing device such as a desktop computer, laptop, server, mobile computing device (e.g., smartphone, tablet, etc.), or any other suitable computing device. Alternatively, host 25 may be a test computer that performs calibration and testing functions as part of the HDD manufacturing process.

The location of a block of data stored on an HDD, such as HDD 15, is specified by a logical block address (LBA), which is a simple linear addressing scheme in which blocks are located by an integer index, with the first block being LBA 0, the second block being LBA 1, and so on. In modern HDDs, one LBA typically corresponds to either 512 bytes or 4,096 bytes (4K) of data, depending on the drive's sector format. LBAs, in turn, are mapped to physical locations on the magnetic storage media (disk) using a mapping construct such as an indirection table, which provides an intermediate layer of address translation.

It sometimes becomes necessary to perform an LBA remapping operation in which the LBAs are remapped to different physical locations on the media. For instance, an LBA remapping operation may be necessary after an HDD formatting operation that involves a block size change. An LBA remapping operation may also be performed following a repurposing depopulation (RDP) operation that removes a defective or failed recording head of the HDD from service, with the other heads remaining in service. After the problematic head is removed from service, the magnetic recording media that is accessible to the remaining operational recording heads is reformatted, but at a reduced capacity since there are now fewer heads. Another situation in which an LBA remapping operation may be needed is in the context of dual-actuator host-managed shingled magnetic recording (DHSMR), when a specific zone or area of a dual-actuator SMR hard disk is changed from using shingled magnetic recording (SMR) to conventional magnetic recording (CMR), or vice versa. These are merely some examples of situations in which an LBA remapping operation is necessary. LBA remapping operations may be necessary in other situations and fall within the scope of this disclosure.

Following an LBA remapping operation, a conventional initialization procedure is performed in which a predetermined background data pattern is written to each of the remapped LBAs. This procedure is sometimes referred to as a "pack write". The background data pattern, if subsequently read, is what the host and the HDD expect to be returned in response to a read command following an initialization, and indicates to the host and the HDD that the LBA has been properly initialized. Writing the background data pattern to the remapped LBAs thereby avoids errors when a host attempts to read from an initialized LBA before it has been written to (host reads before writes), as well as when an initialized LBA is read as part of internal HDD operations (such as track refreshes, background media scans, etc.).

A significant drawback of this initialization procedure that conventionally follows an LBA remapping operation is the very substantial length of time that it takes to complete. Data transfer rates have not kept pace with ever-increasing HDD storage capacities, which now reach sizes of 20-30 TB or more. As a result, the conventional process of initializing an HDD after an LBA remapping operation (i.e., pack writing the background data pattern to every remapped LBA) can be very time-consuming, often taking a day or longer.

In accordance with aspects of this disclosure, a method is provided that advantageously eliminates the need to write a background data pattern to the entire HDD after an LBA remapping operation. The process of rebuilding the drive can begin immediately after the LBA remapping operation without incurring a substantial delay while the background data pattern is written to the HDD. FIG. 2C is a flow diagram of an initialization method 80 that facilitates fast initialization of the magnetic recording media (disks) after an LBA remapping operation that remaps LBAs to different physical locations on the media.

In step 82, a write target LBA is initialized in response to a write command by writing data to a physical location on the magnetic recording media that is mapped to the write target LBA. As described in more detail below, such initial writes to LBAs are handled in a way that reduces memory requirements and increases efficiency. In particular, on a write to a write target LBA, all LBAs within a larger mapping unit that includes the write target LBA are written to and initialized. This is accomplished by padding the write data with the background data pattern such that all LBAs of the mapping unit are written to and initialized. In this way, aggregated groups of LBAs are initialized "on the fly" when any LBA within the group is written to, whether the writes occur in a sequential or random fashion. Once all LBAs of a mapping unit have been initialized in this manner, the value of a validity bit associated with that mapping unit is updated to indicate that the mapping unit is initialized.

Initialization method 80 ensures that reads to LBAs that have not yet been initialized are not directed to the physical storage media, which could potentially lead to errors and loss of data integrity. When a read command is received to read data from a read target LBA (step 84), so long as the read target LBA has already been initialized in step 82, the requested data is read and returned from the physical location on the media that is mapped to the read target LBA (step 86). However, if the read target LBA has not been initialized, the media is not accessed. Instead, the expected background data pattern is generated by the HDD and returned in response to the read command (step 88).

Figures 3A, 3B:
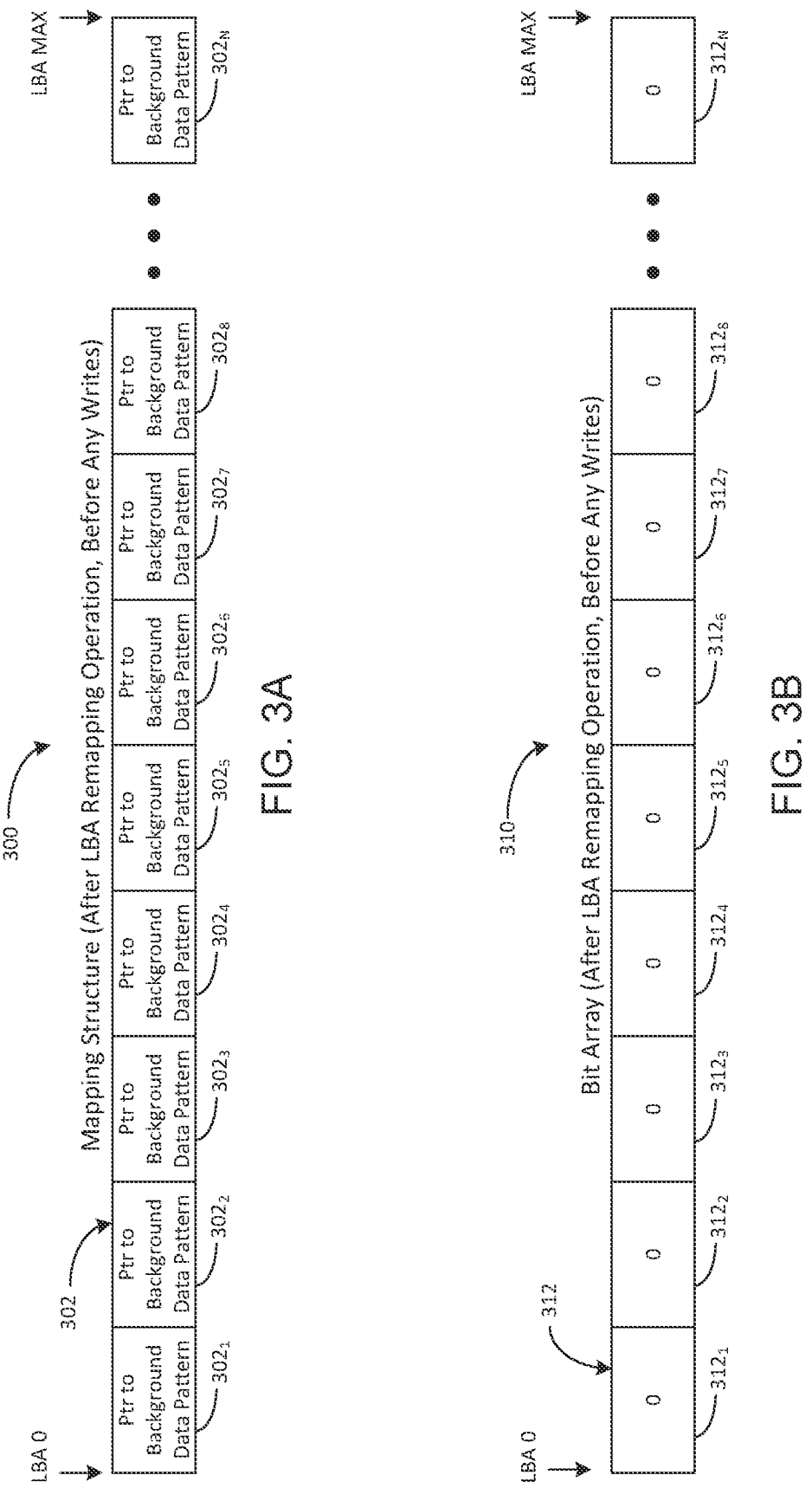
FIG. 3A is a conceptual block diagram of a mapping structure, in a state immediately following an LBA remapping operation and before any LBAs have been written to, in accordance with aspects of this disclosure.
FIG. 3B is a conceptual block diagram of a bit array associated with the mapping structure of FIG. 3A, in accordance with aspects of this disclosure.

Turning now to FIG. 3A, as noted above, LBAs may not be tracked individually but may instead be aggregated into larger mapping units. This concept is illustrated in FIG. 3A, which is a conceptual block diagram of a mapping structure 300, in a state immediately following an LBA remapping operation and before any LBAs have been written to, in accordance with aspects of this disclosure. Mapping structure 300, which may be referred to as an indirection table, comprises a plurality of mapping units 302 ($302_1 \ldots 302_N$), each of which is associated with a plurality of LBAs. Mapping units 302 span the entire range of LBAs that are addressable by the HDD, shown in FIG. 3A as extending from LBA 0 at the beginning of mapping unit 302₁ to LBA MAX at the end of mapping unit $302_N$. Thus, each mapping unit 302 covers a plurality of LBAs, that is, an LBA space that is a portion or subset of the entire range of LBAs.

The combined size of the LBAs covered by a mapping unit has a minimum granularity within a specified range such as, in one non-limiting example, 1-4 MiB. For sake of illustration, if a 4K device is considered where one LBA corresponds to 4,096 bytes of data, and the minimum granularity for the LBA space associated with each mapping unit is set to be 2 MiB, each mapping unit would cover 500 LBAs. In this example, mapping unit 302₁ would correspond to LBAs 0-499, mapping unit 302₂ would correspond to LBAs 500-999, and so on. In this manner, by aggregating the LBAs into larger mapping units, less memory is required for tracking and as further described below, the LBAs can be more quickly and efficiently initialized as they are written to.

It should be emphasized that the particular granularity or size ranges, LBA sizes, and mapping unit sizes discussed in the preceding paragraph are for sake of illustration only and do not limit the scope of this disclosure. Many other granularity or size ranges, LBA sizes, and mapping unit sizes will be suitable for given applications, and fall within the scope of this disclosure.

As shown in FIG. 3A, immediately following an LBA remapping operation, and before any LBAs have been written to, mapping units 302 are not mapped to a physical location on the recording media. Rather, in this initial state, each mapping unit 302 is mapped to a background data pattern that is internally generated by the HDD, such that all LBAs are initially mapped to the background data pattern. LBAs that have not been written to following the LBA remapping operation and that are mapped to the internally-generated background pattern rather than to a physical location on the media are referred to in this description as not initialized. A read command from a host or from an internal operation of the HDD to an LBA ("a read target LBA") that is not initialized returns the generated background data pattern in response and is not directed to a physical location on the media corresponding to that LBA. Importantly, this process is transparent to the host as compared to the traditional process in which, following a lengthy pack write during a conventional initialization procedure, a read command to an LBA not yet written to accesses the physical location on the media to retrieve the background data pattern that was written during the pack write.

Each mapping unit 302 has an associated validity bit that indicates the state of the LBAs associated with that mapping unit. In this regard, FIG. 3B is a conceptual block diagram of a bit array 310 comprising a plurality of validity bits 312 ($312_1 \ldots 312_N$) that are associated with mapping units 302, in accordance with this disclosure. For example, bit 312₁ is associated with mapping unit 302₁, bit 312₂ is associated with mapping unit 302₂, and so on. Thus, bit array 310 covers the entire range of addressable LBAs, extending from LBA 0 at bit 312₁ to LBA MAX at bit $312_N$. FIG. 3B shows bit array 310 in a state immediately following an LBA remapping operation and before any writes have occurred.

Each validity bit 312 indicates whether the LBAs of the mapping unit 302 associated with that bit have been initialized. In one example, bits representing mapping units whose LBAs are not initialized are set to zero, and bits representing mapping units whose LBAs are initialized are set to one. Thus, a bit value of zero indicates that reads to any LBA of the mapping unit associated with the bit should return the internally-generated background data pattern, and a bit value of one indicates that reads to any LBA of the mapping unit associated with the bit can be safely directed to the media location associated with the LBA. At the beginning of the initialization process (immediately following the LBA remapping operation), all validity bits are cleared and set to zero to indicate that no LBAs have been initialized. This is the state of bit array 310 as shown in FIG. 3B.

While the above description indicates that a bit value of zero indicates that the LBAs associated with the bit are not initialized and a bit value of one indicates that the bit values associated with the bit are initialized, these values of course may be reversed or other values may be used. Moreover, associating validity bits with the LBAs is just one example of how the initialization states of the LBAs may be tracked. Other ways of tracking the initialization states of the LBAs are possible and fall within the scope of this disclosure.

Figures 4A, 4B:
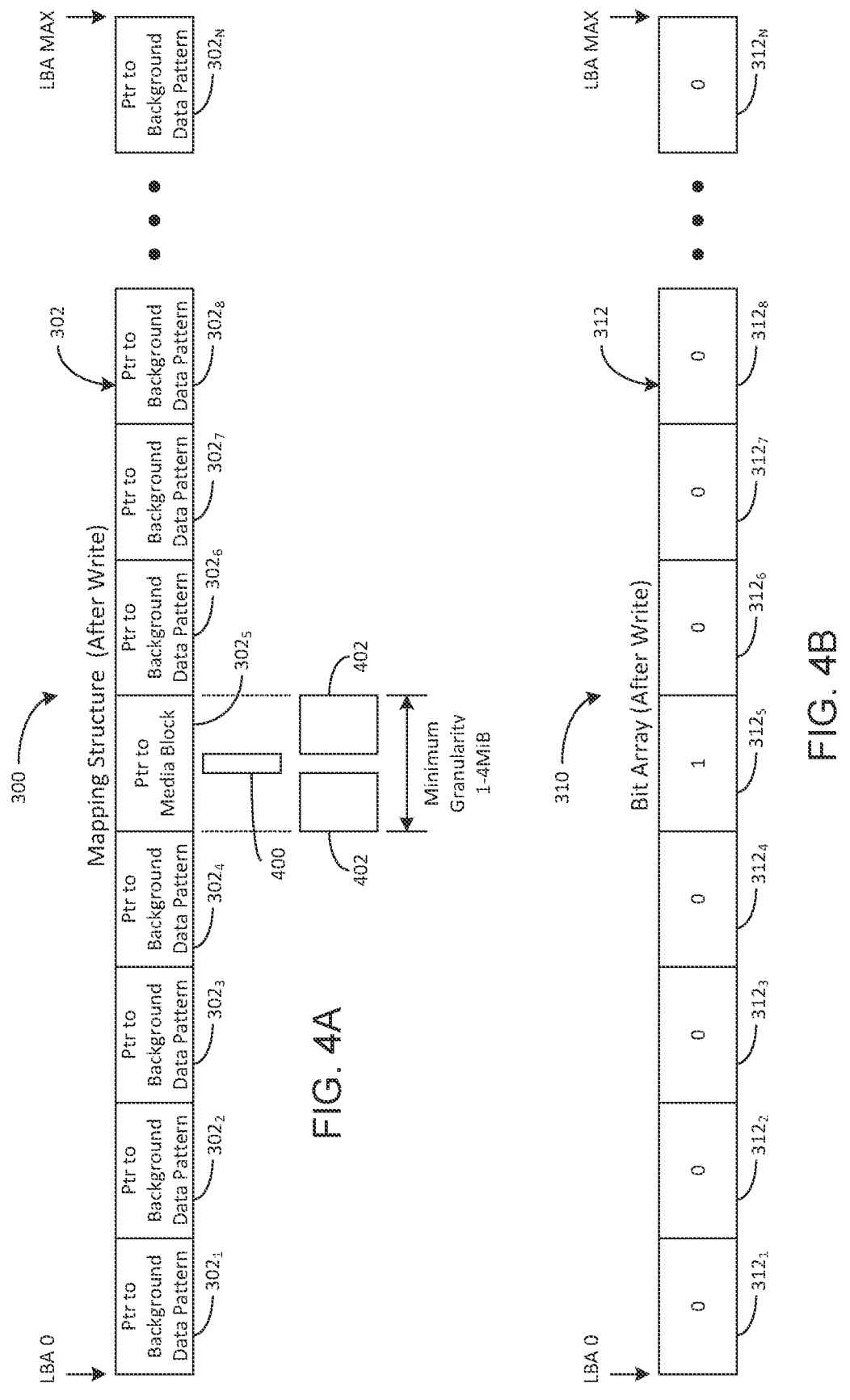
FIG. 4A is a conceptual block diagram of the mapping structure of FIG. 3A, in a state following an LBA remapping operation and after a host write, in accordance with aspects of this disclosure.
FIG. 4B is a conceptual block diagram of a bit array associated with the mapping structure of FIG. 3A, in accordance with aspects of this disclosure.

Once an LBA has been written to following the LBA remapping operation, it is considered to be initialized and subsequent reads to that LBA are directed to the physical location on the media where the data associated with that LBA is stored. As noted above, initial writes to LBAs are handled in a way that reduces memory requirements and increases efficiency. In particular, on a first write to any LBA within a particular mapping unit, all LBAs within that mapping unit are written to and initialized. This concept is illustrated in FIG. 4A, which is a conceptual block diagram of mapping structure 300, in a state following an LBA remapping operation and after a host write, in accordance with aspects of this disclosure. Upon an initial write to an LBA that is not initialized (as is known to the HDD by a bit value of zero for the mapping unit 302 associated with that LBA), the write data for that LBA is padded as needed with the background data pattern so as to write to and initialize all LBAs of that mapping unit. In other words, the write is expanded to completely fill all LBAs covered by the mapping unit.

As shown in the example of FIG. 4A, a host write 400 is performed to a write target LBA that falls within a write target mapping unit 302₅, the LBAs of which are not yet initialized (i.e., in the state of FIGS. 3A-3B). Host write 400 is padded by background data pattern 402 so as to write to and initialize not just the write target LBA, but all LBAs of write target mapping unit 302₅. Thus, an initial write to an LBA of a mapping unit serves to initialize all LBAs of that mapping unit. Once this occurs, the mapping for the write target mapping unit is changed from the background data pattern to the physical location on the media where the data associated with the LBAs of the write target mapping unit is written. As shown in FIG. 4A, after host write 400, the pointer for mapping unit 302₅ is changed to point to a physical media location rather than to the background data pattern. From that point forward, any reads from and writes to the LBAs of mapping unit 302₅ proceed as normal, that is, they are directed to a physical location on the storage media where the data associated with the target LBA is written. Eventually, all LBAs of mapping units 302₁ ... 302_N will be initialized in this manner and any reads from or writes to the HDD going forward will proceed as normal.

In addition to mapping a mapping unit 302 to a physical location on the media after its LBAs are initialized, the value of its associated validity bit 312 is changed from zero to one to indicate that the LBAs associated with that bit have been initialized and may be read from and written to as normal. FIG. 4B is a conceptual block diagram of bit array 310, in a state following host write 400 of FIG. 4A, in accordance with aspects of this disclosure. After host write 400 is performed, including padding by background data pattern 402 to initialize all LBAs of mapping unit 302₅, the value of the associated bit 3125 is changed from zero to one to indicate that the LBAs associated with bit 3125 have been initialized and may be read from and written to as normal. That is, future reads to a target LBA covered by mapping unit 302₅ are directed to the physical location on the storage media where the data associated with the target LBA is written, and future writes to a target LBA covered by mapping unit 302₅ write only the data associated with that write and are not padded with the background storage pattern.

As the first write to an uninitialized LBA triggers writes to all other LBAs within its mapping unit, there is typically a small performance penalty for such first writes. However, since all LBAs of the mapping unit are initialized by that first write, there is no such performance penalty for future writes to any LBA of that mapping unit. Moreover, as the most common process after an LBA remapping operation is to rebuild the HDD, there will typically be many large and sequential operations that essentially overwhelm and eliminate any effects of this penalty. And, even if standard operations are entered immediately, many users only write small blocks in a small metadata area that will initialize very quickly. Any performance penalties are also offset by the reduced memory costs and efficiency gains of tracking only large 1-4 MiB chunks of data rather than every single 4K block that is randomly written. Importantly, according to this disclosure, random first writes to any LBA are accommodated and no changes to the host system are required to ensure that LBAs are first written sequentially. Moreover, by enforcing a minimum granularity for initial writes to an uninitialized LBA, memory costs are reduced while still supporting enterprise level latency requirements.

The methods and flow diagrams disclosed herein are implemented by control circuitry 22, which may be implemented partially or wholly into an integrated circuit (IC) such as a system-on-a-chip (SOC), arm electronics, and/or any other suitable circuitry or controller. Control circuitry 22 may further comprise a microprocessor executing instructions operable to perform the methods and flow diagrams described herein. The instructions may be stored in a computer-readable medium, such as a non-volatile semiconductor memory device that may be external to the microprocessor or integrated with the microprocessor in an SOC. The instructions may alternatively be stored on a disk and read into a volatile semiconductor memory when the HDD is powered on. Control circuitry 22 may comprise logic circuitry such as state machine circuitry or other suitable logic circuitry. The methods and flow diagrams disclosed herein may be implemented using analog circuitry, digital circuitry, or a combination thereof.

One or more processing devices may comprise control circuitry 22 and may perform some or all of the functions of control circuitry 22. Such processing devices may be part of the HDD and/or abstracted away from physically proximity to the HDD. Such processing devices may be part of or proximate to one or more unitary products, racks comprising multiple data storage devices, physical or virtual servers, local area networks, storage area networks, data centers, and/or cloud services. Disk drives or HDDs as disclosed herein may include magnetic, optical, hybrid, or other types of disk drives. Devices such as computing devices, data servers, media content storage devices, and other devices may comprise the storage media and control circuitry described herein.

While certain embodiments are described herein, these embodiments are presented by way of example only, and do not limit the scope of this disclosure. Various omissions, substitutions and changes may be made without departing from the spirit and scope of this disclosure. The methods and processes described herein are not limited to any particular sequence and may be used independently or combined in various ways. Some method or process steps may be omitted and other steps added in some implementations. Nothing in this description implies that any particular feature, component, characteristic, or step is necessary or indispensable. Many variations, modifications, additions, and improvements are possible and fall within the scope of this disclosure as defined by the following claims.

The invention claimed is:

1. A data storage device comprising:

a plurality of recording heads;

a plurality of magnetic recording media; and control circuitry configured to perform a logical block address (LBA) remapping operation that remaps LBAs to physical locations on the plurality of magnetic recording media, wherein responsive to completion of the LBA remapping operation, the control circuitry is configured to perform an initialization process comprising:

responsive to a write command, initializing a write target LBA by writing data to a physical location on the plurality of magnetic recording media that is mapped to the write target LBA;

receiving a read command to read data from a read target LBA;

responsive to the read target LBA having been initialized, reading and returning data from the physical location on the plurality of magnetic recording media that is mapped to the read target LBA; and responsive to the read target LBA having not been initialized, generating and returning, without accessing the plurality of magnetic recording media, a background data pattern.

2. The data storage device of claim 1, wherein the control circuitry is further configured to perform the LBA remapping operation as part of a repurposing depopulation (RDP) operation that removes a recording head of the plurality of recording heads from service and remaps LBAs to physical locations on the plurality of magnetic recording media that remain accessible after depopulating the head, and the initialization process is performed after the RDP operation.

3. The data storage device of claim 1, wherein the initialization process performed by the control circuitry further comprises, before initializing any of the LBAs:
forming a plurality of mapping units, wherein each of the mapping units covers a plurality of the LBAs; and
mapping the mapping units to the background data pattern.

4. The data storage device of claim 3, wherein the initialization process performed by the control circuitry further comprises:
associating each of the mapping units with a validity bit that indicates whether the LBAs covered by an associated mapping unit have been initialized.

5. The data storage device of claim 3, wherein a combined size of the LBAs covered by a mapping unit is in a range of 1-4 Mebibyte (MiB).

6. The data storage device of claim 4, wherein the initialization process performed by the control circuitry further comprises, when initializing the write target LBA:
initializing all of the LBAs of a write target mapping unit covering the write target LBA by writing to physical locations on the plurality of magnetic recording media that are mapped to the LBAs of the write target mapping unit; and
updating the validity bit associated with the write target mapping unit to indicate that the LBAs covered by the write target mapping unit have been initialized.

7. The data storage device of claim 6, wherein the initialization process performed by the control circuitry further comprises, when initializing all of the LBAs of the write target mapping unit:
padding write data of the write target LBA with the background data pattern; and
writing the write data and the background data pattern to physical locations on the plurality of magnetic recording media that are mapped to the LBAs of the write target mapping unit.

8. The data storage device of claim 6, wherein the initialization process performed by the control circuitry further comprises, after initializing all of the LBAs of the write target mapping unit:
changing the mapping of the write target mapping unit from the background data pattern to the physical locations on the plurality of magnetic recording media that are mapped to the LBAs of the write target mapping unit.

9. A method for initializing magnetic recording media of a data storage device responsive to completion of a logical block address (LBA) remapping operation that remaps LBAs to physical locations on the magnetic recording media, the method comprising:
responsive to a write command, initializing a write target LBA by writing data to a physical location on the magnetic recording media that is mapped to the write target LBA;

receiving a read command to read data from a read target LBA;
responsive to the read target LBA having been initialized, reading and returning data from the physical location on the magnetic recording media that is mapped to the read target LBA; and
responsive to the read target LBA having not been initialized, generating and returning, without accessing the magnetic recording media, a background data pattern.

10. The method of claim 9 further comprising, before initializing any of the LBAs:
forming a plurality of mapping units, wherein each of the mapping units covers a plurality of the LBAs; and
mapping the mapping units to the background data pattern.

11. The method of claim 10 further comprising:
associating each of the mapping units with a validity bit that indicates whether the LBAs covered by an associated mapping unit have been initialized.

12. The method of claim 10, wherein a combined size of the LBAs covered by a mapping unit is in a range of 1-4 Mebibyte (MiB).

13. The method of claim 11 further comprising, when initializing the write target LBA:
initializing all of the LBAs of a write target mapping unit covering the write target LBA by writing to physical locations on the magnetic recording media that are mapped to the LBAs of the write target mapping unit; and
updating the validity bit associated with the write target mapping unit to indicate that the LBAs covered by the write target mapping unit have been initialized.

14. The method of claim 13 further comprising, when initializing all of the LBAs of the write target mapping unit:
padding write data of the write target LBA with the background data pattern; and
writing the write data and the background data pattern to physical locations on the magnetic recording media that are mapped to the LBAs of the write target mapping unit.

15. The method of claim 13 further comprising, after initializing all of the LBAs of the write target mapping unit:
changing the mapping of the write target mapping unit from the background data pattern to the physical locations on the magnetic recording media that are mapped to the LBAs of the write target mapping unit.

16. A data storage device comprising:
a plurality of recording heads;
a plurality of magnetic recording media; and
control circuitry configured to perform an initialization process, wherein the initialization process is performed responsive to completion of a logical block address (LBA) remapping operation that remaps LBAs to physical locations on the plurality of magnetic recording media, the initialization process comprising:
responsive to a write command, initializing a write target LBA by writing data to a physical location on the plurality of magnetic recording media that is mapped to the write target LBA;
receiving a read command to read data from a read target LBA;
responsive to the read target LBA having been initialized, reading and returning data from the physical location on the plurality of magnetic recording media that is mapped to the read target LBA; and responsive to the read target LBA having not been initialized, generating and returning, without accessing the plurality of magnetic recording media, a background data pattern.

17. The data storage device of claim 16, wherein the initialization process performed by the control circuitry further comprises, before initializing any LBA:

forming a plurality of mapping units, wherein each of the mapping units covers a plurality of LBAs; and mapping the mapping units to the background data pattern.

18. The data storage device of claim 17, wherein the initialization process performed by the control circuitry further comprises:

associating each of the mapping units with a validity bit that indicates whether the LBAs covered by an associated mapping unit have been initialized.

19. The data storage device of claim 18, wherein the initialization process performed by the control circuitry further comprises, when initializing the write target LBA:

initializing all of the LBAs of a write target mapping unit covering the write target LBA by writing to physical locations on the plurality of magnetic recording media that are mapped to the LBAs of the write target mapping unit; and updating the validity bit associated with the write target mapping unit to indicate that the LBAs covered by the write target mapping unit have been initialized.

20. The data storage device of claim 19, wherein the initialization process performed by the control circuitry further comprises, when initializing all of the LBAs of the write target mapping unit:

padding write data of the write target LBA with the background data pattern; and writing the write data and the background data pattern to physical locations on the plurality of magnetic recording media that are mapped to the LBAs of the write target mapping unit.

21. The data storage device of claim 20, wherein the initialization process performed by the control circuitry further comprises, after initializing all of the LBAs of the write target mapping unit:

changing the mapping of the write target mapping unit from the background data pattern to the physical locations on the plurality of magnetic recording media that are mapped to the LBAs of the write target mapping unit.

* * * * *